United States Patent [19]

Bates et al.

[11] Patent Number: 4,684,696

[45] Date of Patent: Aug. 4, 1987

[54] IMPACT MODIFIED POLYPHENYLENE COMPOSITIONS

[75] Inventors: Gary M. Bates; William R. Haaf, both of Voorheesville; Sai-Pei Ting, Delmar, all of N.Y.

[73] Assignee: General Electric Company, Selkirk, N.Y.

[21] Appl. No.: 839,406

[22] Filed: Mar. 14, 1986

[51] Int. Cl.⁴ ............................................. C08L 71/04
[52] U.S. Cl. .................................... 525/68; 525/148; 525/152; 525/905
[58] Field of Search ................. 525/68, 905, 148, 152

[56] References Cited

U.S. PATENT DOCUMENTS 4,423,187 12/1983 Brandstetter et al. ................ 525/68

Primary Examiner—Jacob Ziegler
Attorney, Agent, or Firm—Michael J. Doyle

[57] ABSTRACT

Thermoplastic compositions comprised of polyphenylene ether resin with or without an alkenyl aromatic resin such as polystyrene can be impact modified with a modifying agent having a core-shell structure comprised of an interpenetrating, crosslinked acrylate core and a crosslinked styrenic shell.

15 Claims, No Drawings

IMPACT MODIFIED POLYPHENYLENE COMPOSITIONS

FIELD OF THE INVENTION

Thermoplastic resin compositions having improved impact strength and thermal properties are provided by combining a polyphenylene ether resin, an optional alkenyl aromatic resin and an impact modifier having a core-shell structure comprised of a crosslinked acrylate core and a crosslinked styrene shell which forms an interpenetrating network between core and shell with minimal grafting between the structures.

BACKGROUND OF THE INVENTION

Polyphenylene ether resins have long been recognized as useful thermoplastic materials for a wide range of applications. Such polyphenylene ether aromatic compositions have superior physical, electrical and thermal properties as well as excellent hydrolytic and dimensional stability.

Polyphenylene ether compositions are combinable with alkenyl aromatic compositions (such as polystyrene) in virtually all proportions and have been improved by the addition of various impact modifiers when additional impact strength is desired. Such impact modifiers are typically natural or synthetic rubber compounds including polymeric and copolymeric compounds such as butadiene rubber, EPDM rubber, di- and triblock copolymers of styrene and butadiene, as well as other elastomeric products. Many of these are commercially available from a variety of sources.

One of the most important impact modifiers for polyphenylene ether-alkenyl aromatic compositions is a saturated rubber known as Kraton G, available from Shell Chemical Company. Kraton G is a saturated triblock copolymer styrene-butadiene-styrene or styrene-ethylene-butylene-styrene (SEBS rubber). These compounds afford useful impact strength improvements as well as superior thermal aging performance. The latter property is especially important in polyphenylene ether-alkenyl aromatic compositions designed for medium to high heat requirement applications. Such superior performance, however, has been achieved at relatively great expense compared to conventionally available impact modification systems and many manufacturers have sought to improve the properties of polyphenylene ether-alkenyl aromatic compositions with other impact modifier candidates.

It has now been discovered that useful polyphenylene ether compounds can be provided which exhibit an improved combination of impact strength and thermal stability in many thermoplastic applications. This improvement is achieved by a combination of the base resin and a modifying compound comprising a crosslinked acrylate core surrounded and interpenetrated by a crosslinked styrene shell. This crosslinked core-shell modifier appears to improve the properties of the basic polyphenylene ether-alkenyl aromatic resin without suffering from the thermal degradation often experienced by conventional modifiers of the unsaturated, i.e. non-hydrogenated type.

SUMMARY OF THE INVENTION

The improved thermoplastic compositions of the present invention are based upon a combination of a polyphenylene ether resin, an optional alkenyl aromatic resin, and a property improving amount of a core-shell modifier having a crosslinked acrylate core which is surrounded and interpenetrated by a crosslinked styrene shell. The integrity of the core-shell structure is maintained by the interpenetration and entanglement of the crosslinked components rather than by grafting.

The polyphenylene ethers may be utilized alone or in combination with alkenyl aromatic resins. Particularly preferred are combinations of poly(2,6-dimethyl-1,4-phenylene ether) and polystyrene (especially rubber modified polystyrene known as high impact polystyrene). A preferred thermoplastic base resin will typically be comprised of 10 to 90 weight percent polyphenylene ether and 90 to 10 weight percent of the alkenyl aromatic component.

The base resin can be improved with various amounts of the core-shell modifier depending upon the particular thermoplastic application. Typically, at least 1 part by weight of the core-shell modifier will be required per 100 parts of the polyphenylene ether-alkenyl aromatic base resin combination. Less than one part will not ordinarily provide very much beneficial effect in the overall composition. Also, greater than 40 parts by weight of the core shell modifier will not ordinarily be utilized per 100 parts of the base resin since the beneficial properties of the polyphenylene ether and alkenyl aromatic resins can be overshadowed by the high rubber content of this loading of the core-shell modifier.

In typical embodiments, 5 to 30 parts by weight of the core-shell modifier will be utilized per 100 parts of the base resin.

Regarding the core-shell modifier, a preferred embodiment would be comprised of a crosslinked butyl acrylate core. This acrylate core will ordinarily comprise approximately 40 to 90 weight percent of the core-shell combination. As stated previously, the preferred shell component is comprised of crosslinked polystyrene.

DESCRIPTION OF THE INVENTION

Polyphenylene ethers are a well known class of compounds sometimes referred to as polyphenylene oxides. Examples of suitable polyphenylene ethers and processes for preparation can be found in U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred polyphenylene ethers used as base resins in compositions of the present invention will be comprised of units derived from 2,6-dimethyl phenol. Also contemplated are PPE copolymers comprised of units derived from 2,6-dimethyl phenol and 2,3,6-trimethyl phenol.

A particularly useful polyphenylene ether would be poly(2,6-dimethyl-1,4-phenylene ether) having an intrinsic viscosity (I.V.) greater than, approximately 0.10 dl/g as measured in chloroform at 25° C. The I.V. will typically be between 0.30 and 0.50 dl/g. PPE having high glass transition temperatures will ordinarily improve the stiffness of the resin compositions.

The alkenyl aromatic resins useful in the present invention are typically the well-known styrenic-based materials which are conventionally utilized in combination with polyphenylene ethers. Preferred styrenics are polystyrene and rubber-modified polystyrene (HIPS). The rubber modified styrenes can be provided by combining or grafting natural or synthetic rubber compounds (e.g. polybutadiene, EPDM) with styrene polymers. These well-known materials are available from a variety of commercial sources.

Those skilled in the art will be able to provide impact improved compositions comprising various proportions of the polyphenylene ether resin, the optional alkenyl aromatic resin and the core-shell impact modifier. Conventional thermoplastic compounding technology such as single or twin screw extrusion can be utilized to provide composition of the present invention.

The above-described weight ratios and percentages represent the compositional formulations of the present invention. The order of combining the components to provide final products may be varied as will be described below.

The preferable core-shell interpolymer modifiers are those having a crosslinked acrylate rubber core, such as butyl acrylate. Surrounding this crosslinked core is a shell-like structure of crosslinked styrenic resin, preferably styrene, which surrounds and interpenetrates the crosslinked core. Incorporation of small amounts of other monomers such as acrylonitrile and/or methyl methacrylate with styrene in the shell can also provide useful products if the resulting copolymer shell does not cause significant incompatibility with the polyphenylene ether-polyamide matrix. The integrity of such preferable core-shell structures is maintained by the interpenetrating network of the several crosslinked moieties rather than by grafting the structures together. The interpenetrating network is provided when the monomers forming the shell structure are polymerized and crosslinked in the presence of the previously polymerized and crosslinked acrylate core.

The core-shell interpolymer compositions may be formed by the following type of two-step, sequential polymerization process:

1. emulsion polymerizing an acrylate monomer charge (herein designated "acrylate", for purposes of the present invention), of at least one $C_2$–$C_{10}$ alkyl acrylate, $C_8$–$C_{22}$ alkyl(meth)acrylate, or compatible mixtures therof, in an aqueous polymerization medium in the presence of an effective amount of a suitable di- or polyethyleneically unsaturated crosslinking agent for such type of monomer, with the $C_4$–$C_8$ alkyl acrylates being the preferred acrylate monomers for use in this step;

2. emulsion polymerizing a monomer charge of styrene in an aqueous polymerization medium, also in the presence of an effective amount of a suitable di- or polyethyleneically unsaturated crosslinking agent for such monomers, said polymerization being carried out in the presence of the product from Step 1 so that the crosslinked (meth)acrylate and crosslinked styrene components form an interpolymer wherein the respective phases surround and penetrate one another.

Such a two-stage polymerization process is analogous to the three step process for producing an acrylate-styrene-acrylonitrile (ASA) terpolymer, as taught by Yu, et al. in U.S. Pat. No. 3,944,631 (which is hereby incorporated by reference).

This core-shell product, which is used as the interpolymer impact modifier in the PPE-alkenyl aromatic blends of the present invention generally comprises from about 40% to about 90%, by weight, of at least one of the above-identified crosslinked acrylates, and from about 10% to about 60%, by weight, of the crosslinked styrene component. It contains little graft polymerization between the crosslinked styrenic copolymer components and the crosslinked acrylate polymeric component. In the preferred embodiments, the core will comprise 50 to 80 weight percent crosslinked acrylate, based on the weight of crosslinked core and crosslinked shell taken together. Further details regarding this type of polymer composition can be found in the aforementioned U.S. Pat. No. 3,044,731 to A. J. Yu, et al. The core-shell interpolymer provided by the foregoing process can be isolated and dried by conventional means and can be provided in powder or pellet form.

The compositions of the present invention will generally be comprised of approximately 1 to 30 parts by weight of the core-shell interpolymer modifier based upon 100 parts of the base resin. It is particularly preferred that about 5 to 25 parts by weight of the core-shell interpolymer additive will be used per 100 parts of the base resin.

The foregoing constituent ingredients can be compounded and molded by conventional means. The order of mixing and degree of shear experienced during extrusion can be varied. It would be expected that the physical properties could vary as such processing conditions are varied. Those skilled in the art will be able to achieve optimum processing conditions which may vary for different thermoplastic applications.

Thus in one instance, each of the ingredients could be blended and extruded at once, thereby providing thermoplastic resin having a particular property profile. Alternatively it may be desirable to pre-blend or pre-compound some of the ingredients while the remaining ingredients are charged later in a compounding or extrusion process.

In one embodiment, the polyphenylene ether could be pre-compounded with the core-shell interpolymer impact modifier. Thereafter, the alkenyl aromatic resin could be charged to the extruder downstream, at a point sufficient to provide adequate mixing but with minimum risk of degradation due to excess heat.

Additionally, it is expected that conventional additives such as fillers, pigments, stabilizers, plasticizers and flame retarding compounds can be incorporated in the thermoplastic compositions of the present invention, thereby providing a variety of useful products. For fillers, both reinforcing and non-reinforcing fillers are contemplated, including glass, clay and other mineral fillers. Conventional heat and oxidative stabilizers may be used. Among the useful flame retarding compounds which may be utilized are organic and inorganic halogen and phosphorus compounds with or without synergists such as, for example, antimony trioxide.

Specific embodiments of the present invention are taught in the following examples which are not limiting in any way. All parts are by weight unless otherwise indicated. All of the foregoing U.S. patents are hereby incorporated by reference.

SYNTHESIS OF CORE-SHELL ADDITIVES

Preparation A: Crosslinked Core/Crosslinked Styrene Shell

A crosslinked polybutylacrylate core having an interpenetrating, crosslinked polystyrene shell was prepared in a five liter, three-necked flask equipped with a heating/cooling jacket, a Teflon blade agitator, a thermometer and a nitrogen purge.

The following solutions were prepared:

| Solution A: | n-butyl acrylate | 751.4 g |
|---|---|---|
| | 1-3 butyleneglycol diacrylate | 1.27 g |
| Solution B: | Sodium Metabisulfite | 1.75 g |
| | deionized water | 27.4 g |
| Solution C: | Ammonium Persulfate | 4.84 g |
| | deionized water | 76.1 g |
| Solution D: | styrene | 250.6 g |
| | divinyl benzene | 2.65 g |
| | (55% active solution from Dow Chemical) | |

Into the reaction flask was charged: 3,460 g deionized water, the following emulsifying agents: 2.1 g Sipex UB sodium lauryl sulfate (from Alcolac, Inc.) and 4.2 g Aerosol A-268, a disodium sulfosuccinate (from American Cyannamid), and 14.6 g of Solution B. The flask was stirred with $N_2$ sparge at room temperature for 30 minutes, to reduce th $O_2$ content.

Thereafter, 150.5 g of $N_2$ sparged Solution A was added. The flask contents were heated to 55° C. and then 13.5 g of Solution C was added to initiate polymerization.

After 1.5 hours of reaction, a sample showed 4.1% resin solids indicating approximately 96% conversion. The remainder of solution A as well as 14.6 g Solution B and 40.4 g Solution C were added. After 2.5 hours of additional reaction time at 55° C. a sample showed 17.2% resin solids, indicating greater than 97% conversion.

The reaction mixture was cooled to 35° C. and Solution D was added and mixed for 15 minutes at 35° C. The reaction mixture was then heated to 60° C. and the remainder of Solution C was added. The mixture was reacted for 1.25 hours. The temperature was raised to 75° C. and maintained for 45 minutes. A final sample showed 22.4% resin solids indicating a conversion greater than 98%.

The product latex was coagulated in a solution of 0.25 weight percent $CaCl_2$ in methanol at a rate of 1600 ml methanol per 800 ml latex. The coagulum was filtered, rinsed with fresh methanol, and dried in a vacuum oven at 60° C.

The product had a rubber content of 75% by weight, a number average latex particle diameter of 211 nanometers, a swell index in methyl ethyl ketone (MEK) of 8.1 and a percent Gel fraction from MEK extraction of 91.1%.

Preparation B: Crosslinked Core/Uncrosslinked Styrene Shell

A crosslinked polybutyl acrylate core with an interpenetrating but uncrosslinked styrene shell was provided in the same manner as for Preparation A, except that the divinyl benzene crosslinker in Solution D was eliminated. A product having a final conversion of approximately 97% was recovered as in Preparation A. The product of preparation B had a rubber content of 75%, an average latex particle diameter of 203 nanometers, a swell index in MEK of 14.4 and a % Gel from MEK extraction of 63.4%.

Preparation C: Crosslinked Core/Crosslinked Styrene-Acrylonitrile Copolymer Shell A crosslinked polybutyl acrylate core with an interpenetrating, crosslinked poly(styrene-co-acrylonitrile) shell was prepard according to the method for Preparation A, except that 30 weight percent acrylonitrile and 70 weight percent styrene monomers were used in Section D.

EXAMPLES 1-4

Experimental thermoplastic blends were mixed by a Henschel mixer, extruded by a 28mm Werner & Pfleiderer twin screw extruder and injection molded into ASTM specimens by a 4 ounce Newbury injection molding machine. Extrusion and molding conditions are described in Table 1. Tables 2-5 describe formulations and properties for compositions of the present invention as well as comparative compositions. Parts are by weight.

All blends contained a total of 1.3 parts by weight of conventional thermoplastic additives ZnO, ZnS and tridecylphosphite. Stereon 840A is a styrene-butadiene rubber compound from Firestone. Kraton G1651 is a styrene-ethylenebutylene-styrene triblock copolymer from Shell Chemical. KM330 is an Acryloid core-shell impact modifier from Rohm & Haas. The polyphenylene oxide is poly(2,6-dimethyl-1,4-phenylene ether) having an intrinsic viscosity of approximately 0.46 dl/g as measured in chloroform at 25° C. The high impact polystyrene is conventional butadiene modified polystyrene. The mineral oil and polyethylene are conventional processing additives. The Izod impact numbers are reported in ft-lb./in., notched. Dynatup falling dart impact is reported in in.-lb. (max. load). Tensile yield and ultimate strengths are KPSI. The degree of delamination was judged from examination of the fractured surfaces of molded parts upon bending, where zero represents no delamination and 5 represents significant delamination.

TABLE 1

| Extrusion Conditions | Temperature Profile, °F. Set | | | | | | Screw Rpm | Torque |
|---|---|---|---|---|---|---|---|---|
| | 1 | 2 | 3 | 4 | 5 | 6 | | |
| Samples - Tables 2 & 3 | 300 | 450 | 480 | 540 | 540 | 540 | 275 | approx. 600 |
| Samples - Tables 4 & 5 | 300 | 450 | 500 | 575 | 575 | 575 | 275 | approx. 600 |

| Molding Condition | Mold Temperature °F. | Backpressure (PSI) | Total Cycle (sec.) | Melt Temperature °F. |
|---|---|---|---|---|
| Samples - Tables 2 & 3 | 170 | 75 | 40 | 575 |
| Samples - Tables 4 & 5 | 200 | 100 | 40 | 605–610 |

TABLE 2

| | A* | B* | C* | D* | 1 |
|---|---|---|---|---|---|
| Components | | | | | |
| Polyphenylene Oxide | 44 | 44 | 44 | 44 | 44 |
| High Impact Polystyrene | 56 | 56 | 56 | 56 | 56 |

TABLE 2-continued

|  | A* | B* | C* | D* | 1 |
|---|---|---|---|---|---|
| Rubber Modifiers: | | | | | |
| Stereon 840A | 4.95 | 4.95 | 4.95 | 4.95 | 4.95 |
| Kraton G1651 | 4.95 | — | — | — | — |
| KM330 | — | 4.95 | — | — | — |
| Preparation A (XL Core/XL Styrene Shell) | — | — | — | — | 4.95 |
| Preparation B (XL Core/Lin Styrene Shell) | — | — | — | 4.95 | — |
| Preparation C (XL Core/XL SAN Shell) | — | — | 4.95 | — | — |
| Mineral Oil | 2.2 | 2.2 | 2.2 | 2.2 | 2.2 |
| Polyethylene | 1.1 | 1.1 | 1.1 | 1.1 | 1.1 |
| Properties | | | | | |
| Heat Distortion Temperature (°F.) | 220 | 223 | 224 | 222 | 220 |
| Flow Channel (in.) | 17.0 | 17.4 | 18.1 | 18.0 | 17.5 |
| Izod Impact (Room Temperature) | 8.1 | 6.3 | 7.6 | 7.5 | 7.5 |
| (−20° F.) | 4.9 | 2.5 | 3.3 | 3.9 | 4.5 |
| (−40° F.) | 4.9 | 2.5 | 3.2 | 3.4 | 3.9 |
| Dynatup Impact (Room Temperature) | 481 | 407 | 462 | 447 | 455 |
| (−20° F.) | 310 | 171 | 295 | 263 | 248 |
| (−40° F.) | 280 | 170 | 243 | 218 | 308 |
| Tensile Yield Strength | 5.8 | 5.7 | 5.7 | 5.7 | 5.7 |
| Tensile Ultimate Strength | 5.6 | 5.7 | 5.7 | 5.8 | 5.7 |
| Tensile Elongation (%) | 67 | 61 | 75 | 83 | 80 |
| Delamination (4 in. × ⅛ in.) | 0.5 | 1 | 1 | 1 | 1 |

*Comparative Examples

TABLE 3

|  | E* | F* | G* | H* | 2 |
|---|---|---|---|---|---|
| Components | | | | | |
| Polyphenylene Oxide | 44 | 44 | 44 | 44 | 44 |
| High Impact Polystyrene | 56 | 56 | 56 | 56 | 56 |
| Rubber Modifiers: | | | | | |
| Kraton G1651 | 9.9 | — | — | 13 | 13 |
| KM330 | — | 9.9 | — | — | — |
| Preparation A (XL Core/XL Styrene Shell) | — | — | — | — | 9.9 |
| Preparation B (XL Core/Lin Styrene Shell) | — | — | — | 9.9 | — |
| Preparation C (XL Core/XL SAN Shell) | — | — | 9.9 | | |
| Mineral Oil | 2.2 | 2.2 | 2.2 | 2.2 | 2.2 |
| Polyethylene | 1.1 | 1.1 | 1.1 | 1.1 | 1.1 |
| Properties | | | | | |
| Heat Distortion Temperature (°F.) | 222 | 227 | 228 | 223 | 223 |
| Flow Channel (in.) | 17.9 | 19.0 | 21.1 | 21.5 | 17.8 |
| Izod Impact (Room Temperature) | 8.7 | 3.4 | 5.9 | 7.0 | 8.4 |
| (−20° F.) | 5.7 | 1.7 | 2.0 | 3.1 | 5.4 |
| (−40° F.) | 5.4 | 1.7 | 1.9 | 3.0 | 4.8 |
| Dynatup Impact (Room Temperature) | 463 | 347 | 411 | 443 | 458 |
| (−20° F.) | 396 | 108 | 137 | 354 | 286 |
| (−40° F.) | 410 | 111 | 55 | 173 | 106 |
| Tensile Yield Strength | 5.6 | 5.7 | 5.6 | 5.8 | 5.9 |
| Tensile Ultimate Strength | 5.4 | 5.8 | 5.3 | 5.7 | 5.8 |
| Tensile Elongation (%) | 83 | 72 | 49 | 62 | 69 |
| Delamination (4 in. × ⅛ in.) | 0.5 | 1 | 4 | 2 | 1 |

*Comparative Examples

TABLE 4

|  | I* | J* | K* | L* | 3 |
|---|---|---|---|---|---|
| Component | | | | | |
| Polyphenylene Oxide | 72 | 72 | 72 | 72 | 72 |
| High Impact Polysterene | 28 | 28 | 28 | 28 | 28 |
| Rubber Modifiers: | | | | | |
| Kraton G1651 | 5 | — | — | — | — |
| KM330 | — | 5 | — | — | — |
| Preparation A (XL Core/XL Styrene Shell) | — | — | — | — | 5 |
| Preparation B (XL Core/Lin Styrene Shell) | — | — | — | 5 | — |
| Preparation C (XL Core/XL SAN Shell) | — | — | 5 | 13 | — |
| Properties | | | | | |
| Heat Distortion Temperature (°F.) | 280 | 284 | 280 | 285 | 288 |
| Flow Channel (in.) | 12.9 | 12.3 | 13.9 | 14.0 | 12.7 |
| Izod Impact (Room Temperature) | 5.1 | 4.1 | 4.3 | 3.9 | 4.6 |
| (−20° F.) | 2.8 | 2.1 | 2.4 | 2.4 | 2.2 |
| (−40° F.) | 2.3 | 1.9 | 2.3 | 2.3 | 2.7 |
| Dynatup Impact (Room Temperature) | 392 | 376 | 435 | 459 | 379 |
| (−20° F.) | 165 | 89 | 148 | 160 | 267 |
| (−40° F.) | 162 | 58 | 54 | 162 | 187 |
| Tensile Yield Strength | 9.2 | 9.5 | 9.6 | 9.9 | 9.7 |
| Tensile Ultimate Strength | 7.7 | 7.7 | 7.7 | 7.7 | 8.1 |

TABLE 4-continued

|  | I* | J* | K* | L* | 3 |
|---|---|---|---|---|---|
| Tensile Elongation (%) | 17 | 21 | 24 | 24 | 17 |
| Delamination (4 in. × ⅛ in.) | 1 | 1 | 3.5 | 2.5 | 2 |

*Comparative Examples

TABLE 5

|  | M* | N* | O* | P* | 4 |
|---|---|---|---|---|---|
| Components | | | | | |
| Polyphenylene Oxide | 72 | 72 | 72 | 72 | 72 |
| High Impact Polystyrene | 28 | 28 | 28 | 28 | 28 |
| Rubber Modifiers: | | | | | |
| Kraton G1651 | 10 | — | — | — | — |
| KM330 | — | 10 | — | — | — |
| Preparation A (XL Core/XL Styrene Shell) | — | — | — | — | 10 |
| Preparation B (XL Core/Lin Styrene Shell) | — | — | — | 10 | — |
| Preparation C (XL Core/XL SAN Shell) | — | — | 10 | — | — |
| Properties | | | | | |
| Heat Distortion Temperature (°F.) | 278 | 287 | 284 | 281 | 281 |
| Flow Channel (in.) | 13.0 | 13.5 | 15.1 | 16.0 | 13.6 |
| Izod Impact (Room Temperature) | 7.1 | 4.7 | 4.3 | 5.2 | 7.2 |
| (−20° F.) | 4.0 | 2.0 | 2.0 | 2.3 | 3.6 |
| (−40° F.) | 3.3 | 2.0 | 2.1 | 2.6 | 3.6 |
| Dynatup Impact (Room Temperature) | 505 | 423 | 165 | 261 | 464 |
| (−20° F.) | 356 | 191 | 34 | 31 | 404 |
| (−40° F.) | 396 | 105 | 43 | 34 | 313 |
| Tensile Yield Strength | 8.6 | 8.8 | 8.7 | 9.1 | 9.1 |
| Tensile Ultimate Strength | 7.1 | 7.3 | 8.2 | 8.4 | 7.4 |
| Tensile Elongation (%) | 22 | 23 | 16 | 13 | 18 |
| Delamination (4 in. × ⅛ in.) | 0.5 | 2.5 | 5 | 5 | 2.5 |

*Comparative Examples

EXAMPLES 5 and 6

Several blends of polyphenylene oxide and impact modifiers were prepared on a ¾ inch Brabender single-screw extruder, at a temperature of approximately 310° C. Pellets of the blended products were molded by a 3 ounce Newbury injection molding machine having a melt temperature of 590° F. and a mold temperature of 190° F. The Hostastat HS-1 is a sodium salt of lauryl sulfonate, available from American Hoechst, and is utilized as a flow promoter for PPO, and is especially useful in compositions as here where the PPO is not plasticized with polystyrene. Each blend also contained 0.3 parts of ZnS and ZnO together. Table 6 describes the formulations and physical properties.

TABLE 6

| SAMPLE | Q* | 5 | 6 | R* | S* |
|---|---|---|---|---|---|
| Polyphenylene Oxide | 100 | 100 | 100 | 100 | 100 |
| Hostastat (HS-1) | 1 | 1 | 1 | 1 | 1 |
| Impact Modifier With X-Link Styrene Shell | — | 5 | 10 | — | — |
| Impact Modifier With Linear Styrene Shell | — | — | — | 5 | 10 |
| HDT (°F.) | 357 | 355 | 352 | 354 | 354 |
| IZOD (FT-LBS/IN) | 1.0 | 2.0 | 5.0 | 1.8 | 3.0 |
| GARDNER (IN-LBS) | 309 | 286 | 244 | 274 | 22 |
| TENSILE YIELD STRENGTH (psi) | 10460 | 10010 | 9580 | 10090 | 7980 |
| TENSILE ULTIMATE STRENGTH (psi) | 8820 | 9900 | 8030 | 9470 | 6650 |
| TENSILE ELONG (%) | 83 | 151 | 75 | 118 | 10 |

We claim:

1. A thermoplastic resin composition having improved resistance to thermal degradation comprising:
   a. a base resin comprising a polyphenylene ether resin with or without an alkenyl aromatic resin; and
   b. a property improving amount of an impact modifying agent core-shell structure consisting essentially of a crosslinked acrylate core and an interpenetrating, essentially graft-free crosslinked styrenic shell wherein the agent is prepared by polymerization of a styrene with polyethylenically unsaturated crosslinking agent in the presence of the crosslinked acrylate core.

2. A composition as in claim 1 wherein said polyphenylene ether resin is a polymer or copolymer comprised of units selected from the groups consisting of 2,6-dimethyl phenylene units and 2,3,6-trimethyl phenylene units.

3. A composition as in claim 2 wherein said polyphenylene ether resin is poly (2,6-dimethyl-1,4-phenylene ether).

4. A composition as in claim 2 wherein said polyphenylene ether resin has an intrinsic viscosity of, approximately 0.30 to 0.60 dl/g as measured in chloroform at 25° C.

5. A composition as in claim 1 wherein said alkenyl aromatic resin is selected from the group consisting of polystyrene resin or rubber modified polystyrene resin.

6. A composition as in claim 1 wherein the weight ratio of polyphenylene ether resin to alkenyl aromatic resin varies from, approximately, 10:90 to 90:10.

7. A composition as in claim 1 wherein said modifying agent is present in an amount of, approximately, 1 to 40 parts by weight per 100 parts by weight of the base resin.

8. A composition as in claim 7 wherein said modifying agent is present in an amount of, approximately, 5 to 25 parts by weight per 100 part by weight of the base resin.

9. A composition as in claim 1 wherein said crosslinked acrylate core is a crosslinked alkyl acrylate core.

10. A composition as in claim 9 wherein said alkyl acrylate is butylacrylate.

11. A composition as in claim 1 wherein the crosslinked acrylate core comprises 40 to 90 weight percent of the crosslinked core and crosslinked shell, taken together.

12. In a method for improving the thermal stability of impact modified polyphenylene ether compositions, wherein the thermoplastic base resin in a compatible combination of a polyphenylene ether resin and an alkenyl aromtaic resin, the improvement which comprises combining such thermoplastic base resin with a property improving amount of an impact modifier having a core-shell structure consisting essentially of a crosslinked acrylate core and an interpenetrating, essentially graft-free crosslinked styrenic shell wherein the agent is prepared by polymerization of a styrene with polyethylenically unsaturated cross-linked agent in the presence of the crosslinked acrylate core.

13. A method as in claim 12 wherein said impact modifier comprises, approximately, 5 to 40 parts by weight per 100 parts of said base resin.

14. A method as in claim 12 wherein said impact modifier is comprised of, approximately, 40 to 90 weight percent crosslinked acrylate, and 50 to 10 percent by weight of said crosslinked styrene component.

15. A product made by the method of claim 12.

* * * * *